… … …

United States Patent Office 2,976,148
Patented Mar. 21, 1961

2,976,148

ANTISTATIC BACKING LAYERS FOR PHOTOGRAPHIC FILM

Raymond J. Walford, Binghamton, N.Y., assignor to General Aniline & Film Corporation, New York, N.Y., a corporation of Delaware No Drawing. Filed Jan. 2, 1957, Ser. No. 632,006

10 Claims. (Cl. 96—87)

This invention relates to photographic film and particularly to a photographic film having antistatic properties.

It is well known that photographic films have a pronounced tendency to generate static electricity. This static can be formed during the manufacture of the film base; during subsequent emulsion coating, trimming and packaging operations, or by operation in the camera, particularly where a series of pictures is taken in rapid succession, for instance, in motion picture cameras and cameras used for X-ray fluorography. The discharge of these static charges, after a photosensitive emulsion coating has been applied to the film base, causes typical static markings on the photographic emulsion and these become visible upon development.

These static marks are especially pronounced in films which are manufactured without an antihalation layer and are, therefore, deprived of the antistatic protection normally provided by such layers, during the manufacturing operation. When such a film without an antihalation layer or other antistatic protection is wound into a tight roll and subsequently unwound, for instance, during coating or while being unwound in a camera magazine, considerable static electricity is generated and eventually given off in the form of spark discharges. After development of the film, the results of these spark discharges show up as black spots, streaks, lines, irregular fogged patterns, or combinations thereof.

Attempts have been made to overcome the generation of such static in films by the incorporation of substances into subbing compositions for the emulsion side which are electrolytes or possess hygroscopic properties. The function of these substances is to impart conductivity to the film and to dissipate the static electricity before discharge and spot exposure of the emulsion. However, most of these hygroscopic substances are incompatible with the subbing compositions which contain cellulose derivatives and gelatin dispersed in organic solvents and thus introduce manufacturing difficulties.

Further attempts have been made to overcome the static caused in films without antihalation layers by the use of a special thin antistatic layer, backing layer or "back-wash" which confers upon the treated film, some measure of antistatic protection but introduces, at the same time, new complications. Typically, these antistatic layers use polymers and copolymers derived from unsaturated carboxylic acids as described in United States Patent 2,074,647. Unfortunately, these layers are usually quite tacky. Since they have to be applied before coating, the unwinding of the film base which precedes the emulsion coating operation requires considerable force with the result that the separation of the rolled-up film causes formation of new centers of static electricity. Moreover, the tackiness of the antistatic backing layer leads to a certain friction between the backing layer and the rollers of the coating machine, thus reducing the slippage properties and increasing the coefficient of friction, again contributing to the formation and discharge of static electricity.

Of the various supports currently utilized for the production of photographic film, those prepared from cellulose organic esters particularly cellulose acetate, cellulose propionate, cellulose butyrate, and mixed cellulose esters have the greatest tendency to acquire rather high electrical charges. When the film is passed over another film surface or over highly polished metal surfaces, this tendency becomes especially pronounced. Anti-static protection of cellulose ester film supports is especially difficult to achieve under conditions of low humidity. The coating operation has therefore been carried out at relatively high humidity levels with adverse influence upon the photographic emulsion characteristics. Even this precaution is no cure-all because the taking of the picture and the processing of the film is often carried out in hot, dry climates with exceptionally low humidity conditions.

The principal object of the present invention is to provide photographic film supports which will possess improved slippage and anti-static properties.

I have discovered that film supports, especially photographic motion picture film prepared from cellulose derivatives such as cellulose acetate, cellulose propionate, cellulose butyrate, cellulose acetate propionate, cellulose acetate butyrate, and the like, can be prepared by coating or swabbing a cellulosic film support itself or the cellulosic side of a finished photographic film with a solution having a pH of 8.0 to 10.5 and containing the alkali metal salt of a long-chain fatty acid having from 8 to 18 carbon atoms and an alkali metal salt of a triple polymer obtained from one molar equivalent of a vinyl ester, e.g., vinyl chloride, vinyl propionate, vinyl butyrate, vinyl acetate, methyl acrylate, ethyl acrylate, butyl acrylate, methyl methacrylate or ethyl methacrylate; one molar equivalent of styrene; and two molar equivalents of acrylic acid.

The use of the triple polymer gives better anti-static protection than hitherto obtainable with polymers or copolymers. The presence of the alkali metal salt of fatty acid which is uniformly dispersed in the backing layer reduces the slippage (as expressed by the reverse coefficient of friction). Quite unexpectedly the fatty acid accomplishes also a synergistic reduction in susceptibility to static electrification and the development of electrostatic charges. This reduction in static susceptibility and the improved slippage properties become especially apparent when the films are exposed in motion picture cameras particularly those using camera magazines. The film is wound by necessity very tightly in magazines and the separation of the emulsion side from the backing requires considerable force, giving rise to the formation of static electricity of the friction and separation type. The combined use of the triple polymer and the fatty acid improves the slippage and reduces the static susceptibility even further.

In practicing the present invention, the fatty acid is dispersed in a suitable solvent, preferably a low boiling alcohol such as methanol, ethanol, propanol or isopropanol. The triple polymer is then dispersed in an alcohol and water mixture and sufficient alkali metal hydroxide is added to raise the pH to the desired level. The amount of resin to be employed may range from 1 to 20 grams per liter of solvent mixture. The amount of fatty acid employed ranges from 0.2 to 4 grams per liter of solvent mixture. Based on the amount of resin used, the amount of fatty acid varies from 5 to 20 percent by weight.

Solutions which I have found particularly suitable for the preparation of any anti-static layers can be compounded in the following proportions, it being understood that the total weight of the resulting solution is to be one kilogram.

| | | |
|---|---|---|
| Triple polymer | gms | 1 to 20 |
| Volatile alcohol | mls | 600 to 800 |
| Water | mls | 200 to 400 |
| Fatty acid | gms | 0.1 to 4 |
| Alkali metal hydroxide | gms | 0.5 to 20 |

The desired alkalinity of the resultant solution is established by the addition of an alkali metal hydroxide solution to a pH ranging from 8.0 to 10.5 with a preferred range of from 9 to 10.

One liter of solution is usually adequate to coat 400 square feet of film base. The thickness of the dried anti-static backing layer ranges from 0.2 to 1 micron, depending on the strength of the solution and to a lesser extent on the coating speed. The amount of total solid deposited on the film base varies from 2 to 40 milligrams per square foot.

A typical triple polymer derived by the copolymerization of vinyl acetate, styrene and acrylic acid is prepared as follows: A mixture of 420 grams (1 molar equivalent) of distilled vinyl acetate, 702.8 grams (2 molar equivalents) of distilled acrylic acid, and 504 grams (1 molar equivalent) of distilled styrene is copolymerized in ethanol solution in the presence of benzoyl peroxide for about 14–16 hours until the viscosity of the reaction mixture reaches a maximum comparable to that of glycerine. The mixture is cooled and poured into a solution of 590 grams of sodium hydroxide in 8 liters of water. Twenty-eight liters of water are added over a period of 25 minutes and the copolymer is precipitated by the addition of 6N hydrochloric acid until a pH of 2 is reached. Upon acidification, the polymer forms a milky colloid which is effectively flocculated by passing steam through the colloid until a temperature of 58° C. is reached. The reaction mixture is then cooled to 35° C. by the addition of ice. The cooled polymer is filtered, washed, dried in air for one day, and then dried in the oven until the odor of styrene has disappeared.

Fatty acids which can be combined with the triple polymer include:

Lauric acid
Myristic acid
Palmitic acid
Stearic acid
Oleic acid

Before proceeding with the practical aspects of the present invention, it will be helpful to briefly describe the testing equipment employed in evaluating the static susceptibility of a treated film.

The relative static susceptibility can be determined by conductivity and resisitvity measurements or by the use of the static generating and measuring device described in United States Patent 2,584,337. For a practical test which shows the actual static marks photographically, the film sample which is provided with a highly sensitive silver halide emulsion layer is submitted to the action of a highly effective static generator. For instance, the sample is placed on an insulated polystyrene plate and rubbed back and forth a predetermined number of times (usually 20 times) with a Nylon® covered sponge rubber cushion. Development of the film with a suitable developer solution shows up the static marks and permits a practical evaluation of static susceptibility with the relative grades of static assigned as follows: none; light; very light; medium; heavy; very heavy.

Surface resistivity as defined inter alia in United States Patent 2,649,374 is an indication of the electrical resistance of the backing side of a film sample. It is determined by measuring the resistance in megohms between two electrodes. These values are influenced by the width and the spacing between the electrodes but this influence can be disregarded because the electrodes and their distance from each other are not changed during the comparison tests.

Slippage, which is the reverse function of the coefficient of friction, is measured by an automatic device measuring the angle at which a metal block slides down an inclined plane which is covered with the material to be tested. The device raises the angle of the plane slowly and the motion is stopped once the block has slid down and hit a contact point which stops the raising motion thus permitting the reading of the angle.

The following examples describe the manner in which the treatment of a film support of a cellulose derivative is effected. These examples are included for purposes of illustration only and are not intended to be construed as limiting the scope of the invention.

*Example I*

A strip of cellulose acetate butyrate film support containing 18.5 percent acetyl and 35 percent butyl was coated with the following composition:

| | | |
|---|---|---|
| Triple polymer of styrene, vinyl acetate and acrylic acid | gms | 4 |
| Stearic acid | gm | 0.4 |
| Methanol | mls | 800 |
| Water | mls | 200 |
| Potassium hydroxide | gms | 1.1 |

The stearic acid was dissolved in about 50 mls. of methanol. The triple polymer was separately dispersed in a mixture of 750 mls. of methanol and 200 mls. of water and the potassium hydroxide added. The two portions were combined by adding the stearic acid solution to the resin solution. The pH of the final solution was then adjusted to 9.5.

After the anti-static layer had dried, a high-speed aerial type gelatin silver halide emulsion was applied to its opposite side and dried. The coated film strip was tested and compared for static susceptibility with a strip of cellulose acetate butyrate which was coated with the same emulsion but had no backing layer. Both samples were submitted to the action of the previously described static generator and then developed in a black and white developer. The untreated sample strip showed very heavy static marks whereas the film provided with the anti-static backing layer showed no static marks at all.

A comparison film, which was prepared in the identical manner except that the stearic acid had been omitted from the coating solution for the anti-static layer, was less satisfactory. The anti-static layer was easily abraded and could be scuffed from the film support. The photographic results were likewise inferior because the film which had been subjected to the static generating treatment showed some improvement over the untreated film but still displayed after development clearly visible static marks.

*Example II*

A strip of a cellulose acetate film support containing 61.5 percent combined acetic acid was coated with a solution having the following composition:

| | | |
|---|---|---|
| Triple polymer of styrene, vinyl acetate and acrylic acid | gms | 6 |
| Palmitic acid | gm | 0.5 |
| Methanol | mls | 800 |
| Water | mls | 200 |
| Potassium hydroxide | gms | 1.3 |

The solids were dissolved in the order described in Example I, and the pH adjusted to a level of 9.

This film was compared with two other films, one from which the palmitic acid had been omitted and one which was provided with an anti-static layer containing calcium silicate and the reaction product of formaldehyde and salicylic acid as described in United States Patent 2,584,337. Static susceptibility measurements as expressed by surface resistivity at 40% relative humidity made by using two electrodes of 10 cm. lengths and spaced 0.2 cm. apart gave the following readings:

|  | Megohms |
|---|---|
| Film having conventional anti-static layer | $5 \times 10^7$ |
| Film having anti-static layer and containing triple polymer | $1 \times 10^4$ |
| Film containing triple polymer and palmitic acid | $1 \times 10^3$ |

The relative slippage of the three samples was measured with the sliding block method described above and the following results were obtained. The values are expressed as the tangent of the angle of which the sliding block moves over the surface of the film:

| Untreated film | Tangent=0.44 |
|---|---|
| Film having an anti-static layer containing triple polymer | Tangent=0.42 |
| Film having an anti-static layer containing triple polymer and palmitic acid | Tangent=0.34 |

It will be observed from these results that the film containing both the fatty acid and the triple polymer shows better slippage characteristics and less static susceptibility than the two comparison samples.

*Example III*

The film samples prepared according to Example II were coated with high speed gelatinous silver halide emulsions of the type used in aerial motion picture cameras. The film samples were allowed to run through motion picture cameras in absolute darkness and were then developed in an ordinary black and white developer, fixed and washed. The developed samples which had untreated cellulose acetate film as a support showed very heavy static marks. The static marks on the film having a conventional backing layer were classified as medium. The samples coated on a film base backed with the triple polymer displayed moderately light static marks. No static marks could be found on the motion picture film coated with the composition of Example II.

The protective nature of the coating containing the salt of the triple polymer together with the salt of the fatty acid becomes most pronounced when tested at low humidities in comparison with the samples containing the triple polymer alone.

The treated photographic film bases produced according to the present invention in addition to preventing the accumulation of static charges when unwound during a coating operation were found to be very satisfactory from the standpoint of physical requirements such as high strength, flexibility, slippage, and good water resistance.

The invention is not limited to the treatment of uncoated photographic film base utilized in the manufacture of such film, but is also useful in treating the back surface of processed photographic roll or sheet film having a cellulose ester base. For instance, it can be used in the treatment of finished motion picture negative film so as to protect the exposed and processed film against the accumulation of dust and dirt particles which occur when the film is moved through a printer or projector.

It will be understood that where in the claims appended hereto the term "film" is used, that such term is intended to include film supports and finished films carrying emulsion layers.

It is not intended that the invention be limited by any of the specific examples which have been given merely for the sake of illustration nor by any theory as to the mechanism of the treating operation since variations of the invention will become apparent to workers in the art. My invention is limited only by the following claims.

I claim:

1. A light sensitive photographic element comprising a cellulose ester film support carrying a silver halide emulsion layer, said element having an antistatic backing layer comprising an alkali metal salt of a triple polymer obtained by the copolymerization of one molar equivalent of vinyl acetate, two molar equivalents of acrylic acid and one molar equivalent of styrene, said backing layer having uniformly dispersed therein the alkali metal salt of a fatty acid having from 8 to 18 carbon atoms, the amount of fatty acid alkali metal salt dispersed in the triple polymer alkali metal salt being from 5 to 20 percent by weight based on the amount of the triple polymer alkali metal salt.

2. A light sensitive photographic element comprising a cellulose ester film support carrying a silver halide emulsion layer, said element having an antistatic backing layer comprising the alkali metal salt of a fatty acid having from 8 to 18 carbon atoms uniformly dispersed in an alkali metal salt of a triple polymer obtained by the copolymerization of one molar equivalent of a lower vinyl ester, two molar equivalents of acrylic acid and one molar equivalent of styrene, the amount of fatty acid alkali metal salt dispersed in the triple polymer alkali metal salt being from 5 to 20 percent by weight based on the amount of the triple polymer alkali metal salt, said backing layer having a pH ranging from 8.0 to 10.5.

3. A light sensitive photographic element according to claim 1 wherein said antistatic backing layer has a thickness ranging from 0.2 to 1 micron.

4. A light sensitive photographic element according to claim 2 wherein said antistatic backing layer has a thickness ranging from 0.2 to 1 micron.

5. A light sensitive photographic element according to claim 1 wherein the total weight of solids in said antistatic backing layer ranges from 2 to 40 milligrams per square foot.

6. A light sensitive photographic element according to claim 2 wherein the total weight of solids in said layer ranges from 2 to 40 milligrams per square foot.

7. A light sensitive photographic element according to claim 1 wherein said alkali metal salt of a fatty acid is potassium stearate.

8. A light sensitive photographic element according to claim 2 wherein said alkali metal salt of a fatty acid is potassium palmitate.

9. A light sensitive photographic element according to claim 1 wherein the amount of said triple polymer in said blocking layer ranges from 1 to 20 grams, the amount of said fatty acid ranges from 0.1 to 4 grams, and the amount of alkali needed to form the alkali metal salt of said fatty acid and of said triple polymer and expressed in terms of alkali metal hydroxide ranges from 0.5 to 20 grams per 400 square feet of coated area.

10. A light sensitive photographic element according to claim 1 wherein said backing layer has a pH ranging from 9 to 10.

References Cited in the file of this patent

UNITED STATES PATENTS

| 1,939,213 | Jelley | Dec. 12, 1933 |
| 2,074,647 | Hagedorn et al. | Mar. 23, 1937 |
| 2,545,702 | Norris | Mar. 20, 1951 |
| 2,548,318 | Norris | Apr. 10, 1951 |
| 2,717,834 | Saner | Sept. 13, 1955 |
| 2,725,297 | Morey | Nov. 29, 1955 |
| 2,737,502 | Land et al. | Mar. 6, 1956 |

UNITED STATES PATENT OFFICE

CERTIFICATE OF CORRECTION

Patent No. 2,976,148                              March 21, 1961

Raymond J. Walford

It is hereby certified that error appears in the above numbered patent requiring correction and that the said Letters Patent should read as corrected below.

Column 2, line 47, for "become" read -- became --; column 4, line 7, for "The" read -- This --; line 19, for "butyl" read -- butyryl --; column 6, line 52, for "blocking" read -- backing --; line 55, for "salt" read -- salts --.

Signed and sealed this 26th day of September 1961.

(SEAL)
Attest:

ERNEST W. SWIDER                                   DAVID L. LADD
Attesting Officer                                       Commissioner of Patents
                                                                                     USCOMM-DC